3,751,511
ISOMERIZATION OF 2-BUTYNE TO
1,2-BUTADIENE
Edward L. Kay and Durward T. Roberts, Jr., Akron, Lawrence E. Calihan, Cuyahoga Falls, and Lynn B. Wakefield, Akron, Ohio, assignors to The Firestone Tire & Rubber Company, Akron, Ohio
No Drawing. Filed June 12, 1972, Ser. No. 261,859
Int. Cl. C07c 5/24, 11/16
U.S. Cl. 260—680 R    5 Claims

ABSTRACT OF THE DISCLOSURE 2-butyne is isomerized to 1,2-butadiene using a catalyst which is a salt of a metal from Group I–A or II–A and an aliphatic alcohol having from one to six carbon atoms. The reaction takes place at a temperature of from 0° to 100° C., and the desired 1,2-butadiene is separated and recovered from the reaction products.

BACKGROUND OF THE INVENTION

This invention relates to isomerization of hydrocarbons, and more specifically, to the catalytic isomerization of 2-butyne to form 1,2-butadiene.

In the production of 1,3-butadiene, highly useful as a polymerization monomer, a number of by-product materials are formed which are separated from 1,3-butadiene. Among these by-products are a variety of four-carbon materials, including 2-butyne, and 1,2-butadiene. In polymerization work it has been found that the presence of a small amount of 1,2-butadiene with 1,3-butadiene is very beneficial, in the control of the molecular weight of the product polymers. 2-butyne, on the other hand, has no beneficial effects on 1,3-butadiene polymerization, and is usually excluded from the reaction.

Because of this situation, a method of converting the relatively unless 2-butyne to 1,2-butadiene was desired.

SUMMARY OF THE INVENTION

A process has now been found by which 2-butyne can be be readily isomerized to produce 1,2-butadiene, which process requires neither extreme pressures and temperatures nor does it use expensive equipment.

Briefly described, the process consists of contacting 2-butyne with a catalyst which is a Group I–A or II–A metal salt of an aliphatic $C_1$ to $C_6$ alcohol at a temperature of from 0° to 100° C. and separating and recovering the desired 1,2-butadiene from the reaction products.

DESCRIPTION OF THE PREFERRED EMBODIMENTS

The catalyst of the invention is a sodium, potassium, lithium, cesium, rubidium, magnesium, calcium, barium or strontium salt of a $C_1$ to $C_6$ aliphatic alcohol such as methanol, ethanol, n-propanol, isopropanol, n-butanol, sec-butanol, tert-butanol, n-pentanol, sec-pentanol, tert-pentanol, n-hexanol, and the like. The sodium and potassium salts of $C_1$ to $C_6$ alcohols are preferred, and potassium-tert-butoxide is most preferred. Two or more of the above alkoxides can be used in combination, if desired.

The starting material, 2-butyne, is preferably used in substantially pure form, that is, at least 95% 2-butyne. Other hydrocarbons can be present in minor amounts, however, without harm to the process. A solvent can be used, if desired, and dimethylsulfoxide is recommended for this purpose.

The process of the invention is operable at from 0° to 100° C., preferably 20° to 40° C. At temperatures below 0° C. the speed of the reaction is prohibitively low, and at temperatures above 100° C., separation of the products becomes difficult and undesirable side reactions can occur.

At the preferred conditions the principal products of the reaction are 1,2-butadiene and 1,3-butadiene. Minor amounts of 1-butyne and butenes are formed, as well as some higher molecular weight hydrocarbons. Since 1,3-butadiene is susceptible to oligomerization and polymerization at these conditions, some dimers, trimers and higher polymers of butadiene are formed. These materials are higher-boiling, and can be separated and recovered from the lower-boiling reaction products by known processes such as distillation.

Separation of the desired 1,2-butadiene from the reaction mixture is most easily accomplished by simple distillation. At a pressure of one atmosphere (760 mm. of mercury) the approximate boiling temperatures of the various four-carbon isomers are as follows:

|  | ° C. |
|---|---|
| 1,2-butadiene | 10.9 |
| 1,3-butadiene | −4.4 |
| 1-butyne | 8.1 |
| 2-butyne | 27 |
| 1-butene | −6.3 |
| 2-butene (cis) | 3.7 |
| 2-butene (trans) | 0.9 |

Hence, by maintaining the reaction temperature approximately at or below the boiling point of 2-butyne, all the four-carbon reaction products can be vaporized and recovered, while the unreacted 2-butyne remains in the reaction zone. By utilizing pressures above or below atmospheric pressure the reaction zone can be maintained at the boiling point of 2-butyne within the operable temperature range of 0° to 100° C. The polymers and oligomers of 1,3-butadiene which are formed can be separated from the 2-butyne by distillation, since they will have considerably higher boiling points, and can be removed from the solvent (if used) by extraction.

The reaction of the invention can be performed either as a batch or a continuous reaction. If the reaction is a batch reaction it can be stopped when the amount of butadiene oligomers has built up to a predetermined level. If a continuous reaction is employed, the butadiene oligomers can be taken off continuously or periodically to prevent excessive build-up in the reaction zone.

The butadiene oligomers are not a primary product of the process of the invention, but they can easily be recovered and have a variety of uses. Some of the cyclic oligomers have utility as polymerization monomers in the production of cyclic polymers.

Of the lower boiling materials, besides the primary product, 1,2-butadiene, the 1,3-butadiene can be separated and employed as a polymerization monomer. Any 2-butyne recovered can be recycled to the reaction zone. Other isomers can be used, further isomerized, or even burned for fuel. As previously mentioned, 1,2-butadiene is of primary utility as a modifier in the polymerization or copolymerization of 1,3-butadiene.

A further understanding of the invention may be obtained by reference to the following example, in which all parts and percentages are by weight, unless otherwise indicated.

EXAMPLE

Fifty grams of potassium-tert-butoxide and 600 grams of dimethylsulfoxide were charged to a stirred reactor and brought to a temperature of 27° C. One hundred grams of 2-butyne was slowly added to the mixture over a period of several hours. Volatilized products were removed through a packed insulated column, and the vapors were condensed in a Dry Ice trap at atmospheric pressure. After three hours the reaction was completed, and the volatile products were analyzed. The following quantities were reported:

| | | |
|---|---|---|
| 1,3-butadiene | Percent | 41.7 |
| 1,2-butadiene | do | 49.1 |
| 1-butyne | do | 9.1 |
| Butenes | do | 0.1 |
| Total volatile product weight | grams | 45 |

The volatiles were fractionated to separate the 1,2-butadiene.

We claim:

1. The process of isomerizing 2-butyne to form 1,2-butadiene comprising contacting the 2-butyne with a catalyst comprising a Group I-A or II-A metal salt of an aliphatic $C_1$ to $C_6$ alcohol at a temperature of from 0° to 100° C., removing from the reaction zone those reaction products having a boiling point lower than that of 2-butyne, and separating and recovering the 1,2-butadiene therefrom.

2. The process of claim 1, in which the reaction is performed in a medium of dimethylsulfoxide.

3. The process of claim 1, in which the catalyst is a sodium or potassium salt of a $C_1$ to $C_6$ alocohol.

4. The process of claim 3, in which the catalyst is potassium-tertiary-butoxide.

5. The process of claim 1, in which the temperature is from 20° C. to 40° C.

References Cited

UNITED STATES PATENTS

| | | | |
|---|---|---|---|
| 3,579,600 | 5/1971 | Dickerson | 260—680 X |
| 3,432,498 | 3/1969 | Kurtz et al. | 260—680 X |

FOREIGN PATENTS

| | | | |
|---|---|---|---|
| 507,847 | 6/1939 | Great Britain | 260—680 |

OTHER REFERENCES

Faraday's Encyclopedia of Hydrocarbon Compounds, ($C_4$–$C_5$), vol. 1b, pp. 04010.00.01 and 04014.00.01.

PAUL M. COUGHLAN, JR., Primary Examiner

U.S. Cl. X.R.

260—678

PO-1050
(5/69)

UNITED STATES PATENT OFFICE
CERTIFICATE OF CORRECTION

Patent No. __3,751,511__ Dated __August 7, 1973__

Inventor(s) __Edward L. Kay; Durward T. Roberts, Jr.;
Lawrence E. Calihan; and Lynn B. Wakefield__

It is certified that error appears in the above-identified patent and that said Letters Patent are hereby corrected as shown below:

Col. 1, line 38, "unless" should read --useless-- line 43, first "be" to be eliminated

Signed and sealed this 27th day of November 1973.

(SEAL)
Attest:

EDWARD M. FLETCHER, JR.
Attesting Officer

RENE D. TEGTMEYER
Acting Commissioner of Patents